United States Patent [19]

Middledorp et al.

[11] Patent Number: 5,341,496

[45] Date of Patent: Aug. 23, 1994

[54] APPARATUS AND METHOD FOR INTERFACING HOST COMPUTER AND COMPUTER NODES USING REDUNDANT GATEWAY DATA LISTS OF ACCESSIBLE COMPUTER NODE DATA

[75] Inventors: Frans M. Middledorp, Attleboro; Allan P. Fournier, North Attleboro, both of Mass.

[73] Assignee: The Foxboro Company, Foxboro, Mass.

[21] Appl. No.: 105,766

[22] Filed: Aug. 11, 1993

Related U.S. Application Data

[63] Continuation of Ser. No. 574,706, Aug. 29, 1990, abandoned.

[51] Int. Cl.$^5$ .................... G06F 13/00; G06F 11/20
[52] U.S. Cl. ................. 395/575; 364/DIG. 1; 364/253; 364/266.5; 364/268; 364/268.3; 364/242.94
[58] Field of Search ............... 395/575, 200, 600, 800; 371/7, 11.1, 9.1

[56] References Cited

U.S. PATENT DOCUMENTS

| | | | |
|---|---|---|---|
| 4,371,754 | 2/1983 | De et al. | 371/9.1 |
| 4,644,468 | 2/1987 | Doster et al. | 364/DIG. 1 |
| 4,718,005 | 1/1988 | Feigenbaum et al. | 364/DIG. 1 |
| 4,731,734 | 3/1988 | Gruner et al. | 364/DIG. 1 |
| 4,817,091 | 3/1989 | Katzman et al. | 364/DIG. 1 |
| 4,823,256 | 4/1989 | Bishop et al. | 364/200 |
| 4,879,716 | 11/1989 | McNally et al. | 371/9.1 |
| 5,008,805 | 4/1991 | Fiebig et al. | 371/9.1 |
| 5,027,269 | 6/1991 | Grant et al. | 371/9.1 |
| 5,121,486 | 6/1992 | Kurihara et al. | 371/9.1 |
| 5,125,091 | 6/1992 | Staas, Jr. et al. | 364/DIG. 1 |
| 5,202,981 | 4/1993 | Shackelford | 395/600 |

*Primary Examiner*—Eddie P. Chan
*Attorney, Agent, or Firm*—Jules Jay Morris; Steven M. Mills; Mary Lou Wakimura

[57] ABSTRACT

Application interface software provides communication between a network of computer nodes and user applications of a host processor. Interpreters or gateways are used between the host processor and the network of computer nodes. The application interface software employs a redundancy routine to ensure host access of computer node data through the gateways. The redundancy routine changes access of computer node data from one gateway to a second gateway during times of dysfunctioning of the one gateway. The redundancy routine changes access in a manner which is transparent to the host processor. A database is employed to hold computer node data for direct access by the host processor. The redundancy routine ensures the latest computer node data values to be reflected in the database.

9 Claims, 10 Drawing Sheets

Before Failure of INI - 1

71 INI - 1

| List | Id | Curr. |
|---|---|---|
| 1 | 0 | 1 |
| 2 | 1 | 1 |
| 3 | 2 | 1 |
| 4 | 3 | 1 |
| 5 | 4 | 1 |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

73 INI - 2

| List | Id | Curr. |
|---|---|---|
| 1 | 0 | 2 |
| 2 | 1 | 2 |
| 3 | 2 | 2 |
| 4 | 3 | 2 |
| 5 | 4 | 2 |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

After Failure of INI - 1

71 INI - 1

| List | Id | Curr. |
|---|---|---|
| 1 | 5 | 2 |
| 2 | 6 | 2 |
| 3 | 7 | 2 |
| 4 | 8 | 2 |
| 5 | 9 | 2 |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

73 INI - 2

| List | Id | Curr. |
|---|---|---|
| 1 | 0 | 2 |
| 2 | 1 | 2 |
| 3 | 2 | 2 |
| 4 | 3 | 2 |
| 5 | 4 | 2 |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

Curr. = Current INI the list is opened on.
Id = Id of the list
List = List number on the initial (perfered INI)

*FIG. 7a*

Before Failure of INI - 1

71 — INI - 1

| List | Id | Curr. |
|---|---|---|
| 1 | 0 | 1 |
| 2 | 1 | 1 |
| 3 | 2 | 1 |
| 4 | 3 | 1 |
| 5 | 4 | 1 |
| 6 | 5 | 1 |
| 7 | 6 | 1 |
| 8 | 7 | 1 |
| 9 | 8 | 1 |
| 10 | 9 | 1 |
| 11 | 10 | 1 |
| 12 | 11 | 1 |
| 13 | 12 | 1 |
| 14 | 13 | 1 |
| 15 | 14 | 1 |
| 16 | | |
| 17 | | |
| 18 | | |
| 19 | | |
| 20 | | |

73 — INI - 2

| List | Id | Curr. |
|---|---|---|
| 1 | 0 | 2 |
| 2 | 1 | 2 |
| 3 | 2 | 2 |
| 4 | 3 | 2 |
| 5 | 4 | 2 |
| 6 | 5 | 2 |
| 7 | 6 | 2 |
| 8 | 7 | 2 |
| 9 | 8 | 2 |
| 10 | 9 | 2 |
| 11 | | |
| 12 | | |
| 13 | | |
| 14 | | |
| 15 | | |
| 16 | | |
| 17 | | |
| 18 | | |
| 19 | | |
| 20 | | |

After Failure of INI - 1

71 — INI - 1

| List | Id | Curr. |
|---|---|---|
| 1 | 10 | 2 |
| 2 | 11 | 2 |
| 3 | 12 | 2 |
| 4 | 13 | 2 |
| 5 | 14 | 2 |
| 6 | 15 | 2 |
| 7 | 16 | 2 |
| 8 | 17 | 2 |
| 9 | 18 | 2 |
| 10 | 19 | 1 |
| 11 | -1 | 1 |
| 12 | -2 | 1 |
| 13 | -3 | 1 |
| 14 | -4 | 1 |
| 15 | -5 | 1 |
| 16 | | |
| 17 | | |
| 18 | | |
| 19 | | |
| 20 | | |

73 — INI - 2

| List | Id | Curr. |
|---|---|---|
| 1 | 0 | 2 |
| 2 | 1 | 2 |
| 3 | 2 | 2 |
| 4 | 3 | 2 |
| 5 | 4 | 2 |
| 6 | 5 | 2 |
| 7 | 6 | 2 |
| 8 | 7 | 2 |
| 9 | 8 | 2 |
| 10 | 9 | 2 |
| 11 | | |
| 12 | | |
| 13 | | |
| 14 | | |
| 15 | | |
| 16 | | |
| 17 | | |
| 18 | | |
| 19 | | |
| 20 | | |

Curr. = Current INI the list is opened on.
Id = Id of the list
List = List number on the initial (perfered INI)

*FIG. 7b*

71 Start of figure is the end state of figure 7b  73

INI - 1

| List | Id | Curr. |
|---|---|---|
| 1 | 10 | 2 |
| 2 | 11 | 2 |
| 3 | 12 | 2 |
| 4 | 13 | 2 |
| 5 | 14 | 2 |
| 6 | 15 | 2 |
| 7 | 16 | 2 |
| 8 | 17 | 2 |
| 9 | 18 | 2 |
| 10 | 19 | 1 |
| 11 | -1 | 1 |
| 12 | -2 | 1 |
| 13 | -3 | 1 |
| 14 | -4 | 1 |
| 15 | -5 | 1 |
| 16 | | |
| 17 | | |
| 18 | | |
| 19 | | |
| 20 | | |

INI - 2

| List | Id | Curr. |
|---|---|---|
| 1 | 0 | 2 |
| 2 | 1 | 2 |
| 3 | 2 | 2 |
| 4 | 3 | 2 |
| 5 | 4 | 2 |
| 6 | 5 | 2 |
| 7 | 6 | 2 |
| 8 | 7 | 2 |
| 9 | 8 | 2 |
| 10 | 9 | 2 |
| 11 | | |
| 12 | | |
| 13 | | |
| 14 | | |
| 15 | | |
| 16 | | |
| 17 | | |
| 18 | | |
| 19 | | |
| 20 | | |

71 After INI - 1 returns to a OK state  73

INI - 1

| List | Id | Curr. |
|---|---|---|
| 1 | 5 | 1 |
| 2 | 6 | 1 |
| 3 | 7 | 1 |
| 4 | 8 | 1 |
| 5 | 9 | 1 |
| 6 | 10 | 1 |
| 7 | 11 | 1 |
| 8 | 12 | 1 |
| 9 | 13 | 1 |
| 10 | 14 | 1 |
| 11 | 0 | 1 |
| 12 | 1 | 1 |
| 13 | 2 | 1 |
| 14 | 3 | 1 |
| 15 | 4 | 1 |
| 16 | | |
| 17 | | |
| 18 | | |
| 19 | | |
| 20 | | |

INI - 2

| List | Id | Curr. |
|---|---|---|
| 1 | 0 | 2 |
| 2 | 1 | 2 |
| 3 | 2 | 2 |
| 4 | 3 | 2 |
| 5 | 4 | 2 |
| 6 | 5 | 2 |
| 7 | 6 | 2 |
| 8 | 7 | 2 |
| 9 | 8 | 2 |
| 10 | 9 | 2 |
| 11 | | |
| 12 | | |
| 13 | | |
| 14 | | |
| 15 | | |
| 16 | | |
| 17 | | |
| 18 | | |
| 19 | | |
| 20 | | |

Curr. = Current INI the list is opened on.
Id = Id of the list
List = List number on the initial (perfered INI)

*FIG. 7c*

APPARATUS AND METHOD FOR INTERFACING HOST COMPUTER AND COMPUTER NODES USING REDUNDANT GATEWAY DATA LISTS OF ACCESSIBLE COMPUTER NODE DATA

This is a continuation of co-pending application Ser. No. 07/574,706 filed on Aug. 29, 1990 now abandoned.

BACKGROUND OF THE INVENTION

In a process plant, various processes are employed to produce amounts of a desired product. The various processes are performed by a system of devices (vats, transfer lines, machinery and the like) operated in series or parallel. In addition, electronic sensing and computer control have been incorporated to detect and correct errors or unwanted changes in processing status, for example pressure, temperature and flow volume, and thus maximize processing.

Recently, other add-on computer programs or user applications have been utilized with processing systems to provide historization, accounting modelling, optimization, and/or inventory management. Typically, a host processor and a network of computer workstations or modules are employed to support the various computer control and add-on computer programs.

One disadvantage has been that the different add-on computer programs are not always compatible with current configurations of the host processor and thus require certain interfacing. Various interfaces are known and each have certain disadvantages and advantages and are typically system specific.

SUMMARY OF THE INVENTION

The present invention is directed toward an interface between add-on programs (or the host processor on which the programs are executed) and a network of working computer nodes of a process system. Specifically, the present invention ensures add-on program access to data in the process system or various working computer nodes thereof.

This is accomplished by multiple gateways into the process system and a data handling scheme which employs redundancy of data. The gateways serve as interpreters between an add-on program (i.e., the host processor) and the computer nodes of the process system. Each gateway supports access to respective data in the process system according to lists of the gateway. The redundancy portion of the data handling scheme provides copying of data lists from an initial gateway to an available substitute gateway when the initial gateway fails.

Program access of data is then supported by the substitute gateway currently holding the data lists although no change in protocol from the program end is required. That is, the data handling redundancy scheme changes data lists of gateways in a manner which is transparent to the host processor and add-on programs thereof.

In accordance with one aspect of the present invention, the process system is an object oriented system in which data is accessed by name and not memory address. This enables a program to request data according to name no matter which gateway (an initial one or a substitute one) is currently supporting access of the data.

In accordance with another aspect of the present invention, when the failed initial gateway has been rectified and has returned to a functional state, the data handling redundancy scheme replaces copied data lists in the initial gateway from the substitute gateway.

Further, a preferred embodiment of the present invention employs a database for holding computer node data. The database provides direct program/host processor access to the computer node data while the data handling redundancy scheme maintains the database.

Preferably, the data handling scheme is a data handler routine executable in the host processor, or similar means coupled to the host processor.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
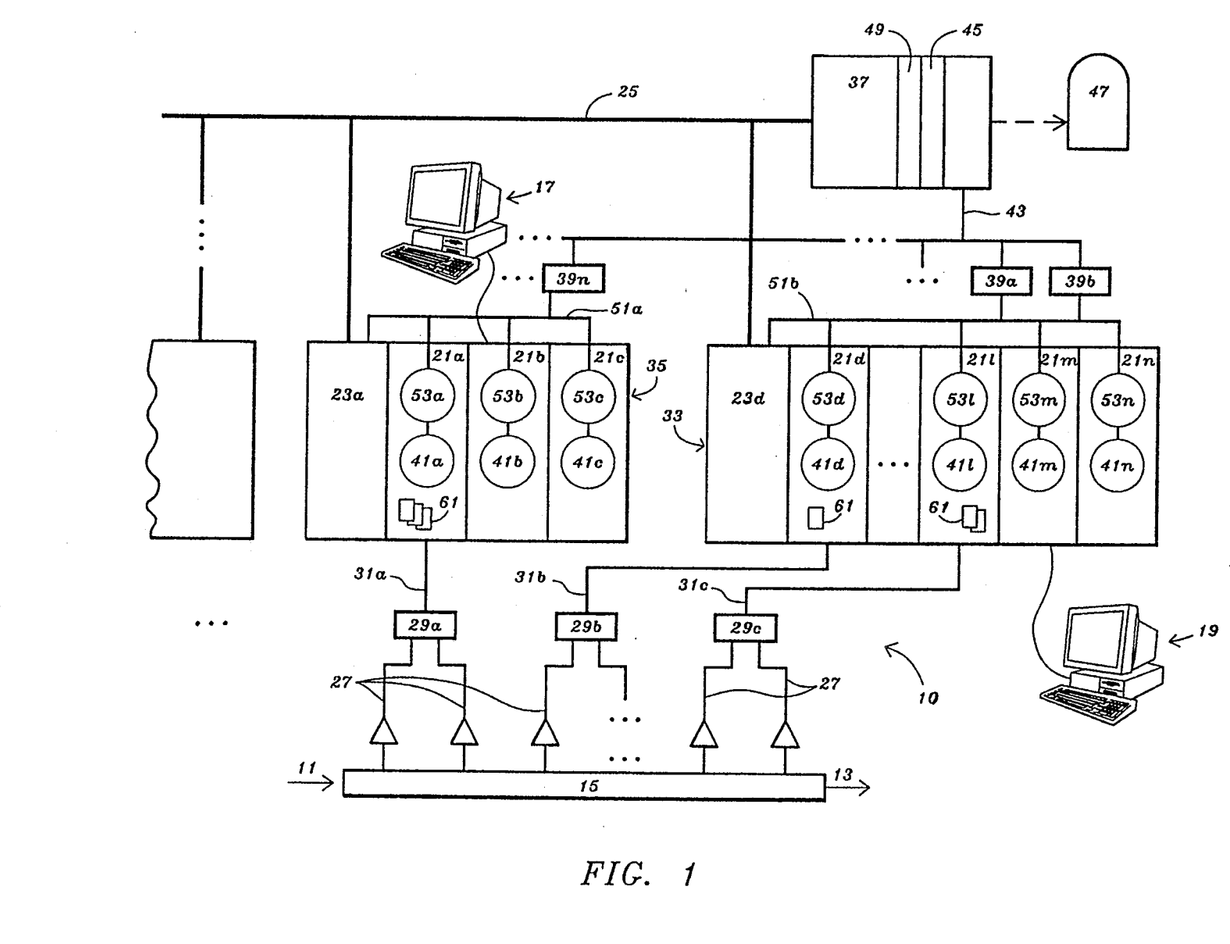
FIG. 1 is a schematic view of a manufacturing or a process plant employing the present invention.

Illustrated in FIG. 1 is a general manufacturing plant 10 in which an embodiment of the present invention may be employed. Manufacturing operations begin at 11 and involve processing through a series or patterns of process means collectively indicated at 15. The final (output) product or batch thereof exits the manufacturing operations at 13. The process means 15 includes vats, mixers, heating units, conveyer belts, pumps, transfer lines together with valving assemblies and the like for performing various processes required to make the various products of the plant.

Sensors 27 are coupled to the process means 15 to detect temperature, pressure, volume, weight, flow volume, flow rate and other desired physical and/or chemical aspects of the process means 15. Such sensors 27 include, but are not limited to temperature sensors, pressure gauges and the like for detecting the desired physical and/or chemical aspects. The sensors 27 generate analog or digital signals which are received by field bus modules 29a, 29b, 29c.

The field bus modules 29a, 29b, 29c convert and format the received sensor signals as described in product specifications PSS21H-2B1 B3, "Intelligent Automation Series Field Bus Modules" by the Foxboro Company, Foxboro, Mass. and herein incorporated by reference. The field bus modules 29a, 29b, 29c transmit across field buses 31a, 31b, 31c, preferably of the multi-drop type, the converted and formatted digital sensor signals to computer nodes 35, 33. Each computer node 35, 33 supports a different workstation (or computer terminal) 17, 19 of the plant 10 and is formed of a plurality of processor modules 21 and an interface module 23. Communication between modules 21, 23 of the same computer node 33, 35 is supported over a serial back plane 51. And communication between different computer nodes 33, 35 is supported over a carrier band local area network (LAN) 25 or other suitable bus assembly for internode communication.

In a preferred embodiment, each processor module 21 has its own operating system 53 and applications environment. Only certain processor modules 21a, 21d, 21l receive the converted and formatted sensor signals from a respective field bus module 29b, 29c. These processor modules 21 store the signals in local memory in object oriented program structures called input blocks 61. Each input block 61 is assigned a block name and the block name is catalogued in the processor modules 21a, 21d, 21l object or datapoint directory (not shown). Each entry in the directory provides a pointer or other memory address indicator to the corresponding input block 61. The other processor modules 21 similarly hold data in local memory as object oriented blocks 61. Names of these blocks and corresponding memory addresses are catalogued in respective object directories of the modules 21.

Each of the processor modules 21 employs an object manager 41 which manages the import and export of input and other data blocks between modules of a computer node 33, 35 along serial backplane 51, as well as between modules of different computer nodes 33, 35 along the carrier band LAN 25. Further details of the object manager 41 are found in U.S. application Ser. No. 07/485,698 assigned to the Assignee of the present invention and herein incorporated by reference. In sum, the object managers 41 of the computer nodes 33, 35 enable objects (e.g. input/data blocks 61) to be accessed by name instead of memory location or address, wherever in the network the object may be stored.

Referring back to FIG. 1, a host computer 37 provides central control and operation throughout the plant network 10 over the LAN 25. Preferably, the host computer 37 is a DEC VAX/VMS or an HP 9000 which supports an X.25 card by Digital Equipment Corporation or Hewlett-Packard Company. The X.25 card provides various functionality including the synchronous transmitting of data between the host computer 37 and gateways 39, discussed later. Also included in the host 37 is a packet switching interface which provides adjustment of data packages for better transmission over the X.25 link 43 to gateways 39 discussed later. Preferably, the packet switching interface is the Packetnet Systems Interface (PSI) manufactured by Digital Equipment Corporation or Hewlett-Packard Company.

Typically running on the host 37 are various software applications 49 which provide historization, plant optimization and other management information as desired. Accordingly, data objects 61 are shared between computer nodes 33, 35 and the software applications 49 of host 37. To aid execution of such software applications 49, an application interface software (AIS) package 45 is concurrently executed within host 37, and translator devices 39 are employed between the object manager configured computer nodes 33, 35 and the host configured software applications 49.

In the preferred embodiment, a plurality of information network interfaces 39 (INI-10's) are employed to serve as gateways or translators between object manager requests and X.25 messages. The INI-10's (gateways 39) are coupled between host 37 and the serial backplane 51 of computer nodes 33, 35 as shown in FIG. 1. Preferably the INI-10's are of the CmP15 type manufactured by the Foxboro Company, Foxboro, Mass. and follow the CCITT standard of protocol across the X.25 link 43 to the host 37.

Access of objects is organized in a list. Each INI-10 (gateway 39) enables twenty lists of up to fifty data objects 61 per list to be accessed (i.e. 1000 data objects per INI-10). Specifically the AIS 45 runs in the host 37 and opens lists on an INI-10 to make object access possible to software applications 49 in host 37. A user (e.g. software application 49) of the AIS 45 organizes desired objects in sets, where a set may be from one to n objects, n being the maximum number of objects accessible through the total number of INI-10's of the plant system 10. For example, with four INI-10's n is 4,000 (i.e. 4×1,000). The set is assigned an identification number called the set number. In the preferred embodiment, the user of the AIS 45 specifies a preferred INI-10 (gateway 39) for each desired object 61. Thus, one user-specified set may initiate access of objects 61 using multiple lists and multiple INI-10's (gateways 39).

Concurrently, the AIS 45 updates a host database 47 with the most recent set of object values. Any further access of objects is done by the software application 49 (i.e. the user of the AIS 45) using the set number or by reading the object values from the database 47. The knowledge of relationship between the involved INI-10 (gateway 39) and the accessed object is not necessary of the user of the AIS 45. The relationship between the accessed object and the INI-10 (gateway 39) is kept internal within the AIS 45. This makes it possible for AIS to access an object, in case of a failing INI-10 (gateway 39), using another INI-10 (gateway 39) without degrading the accessibility by the AIS user.

Hence between database updates, the AIS 45 constantly monitors the state of each INI-10 (gateway 39). If one of the INI-10's (gateways 39) fails, new lists are opened on any available INI-10 (gateway 39) for storing the object values of the failed INI-10. When the failed INI-10 (gateway 39) is again operable, the back up list is transferred back to the original INI-10 (gateway 39).

To that end, the present invention provides what is known as redundancy, to keep as many objects accessible as possible when various INI-10's fail.

To supply redundancy, it is necessary to have two or more INI-10's (gateways 39) coupled to the same computer node 33, 35 with some free lists. The redundancy scheme of the present invention keeps as many lists open on the preferred INI-10 (gateway 39) and if this is not possible, then on any other INI-10 corresponding to the computer node 33, 35. The result is that lists are moved from a failing INI-10 (gateway 39) to a functional INI-10 (gateway 39) and the lists are moved back to their preferred INI-10 (gateway 39) as soon as that INI-10 (gateway 39) returns to a functional state.

The preferred implementation of the foregoing in the present invention is illustrated in FIGS. 2 through 6 and discussed next.

Figure 6:
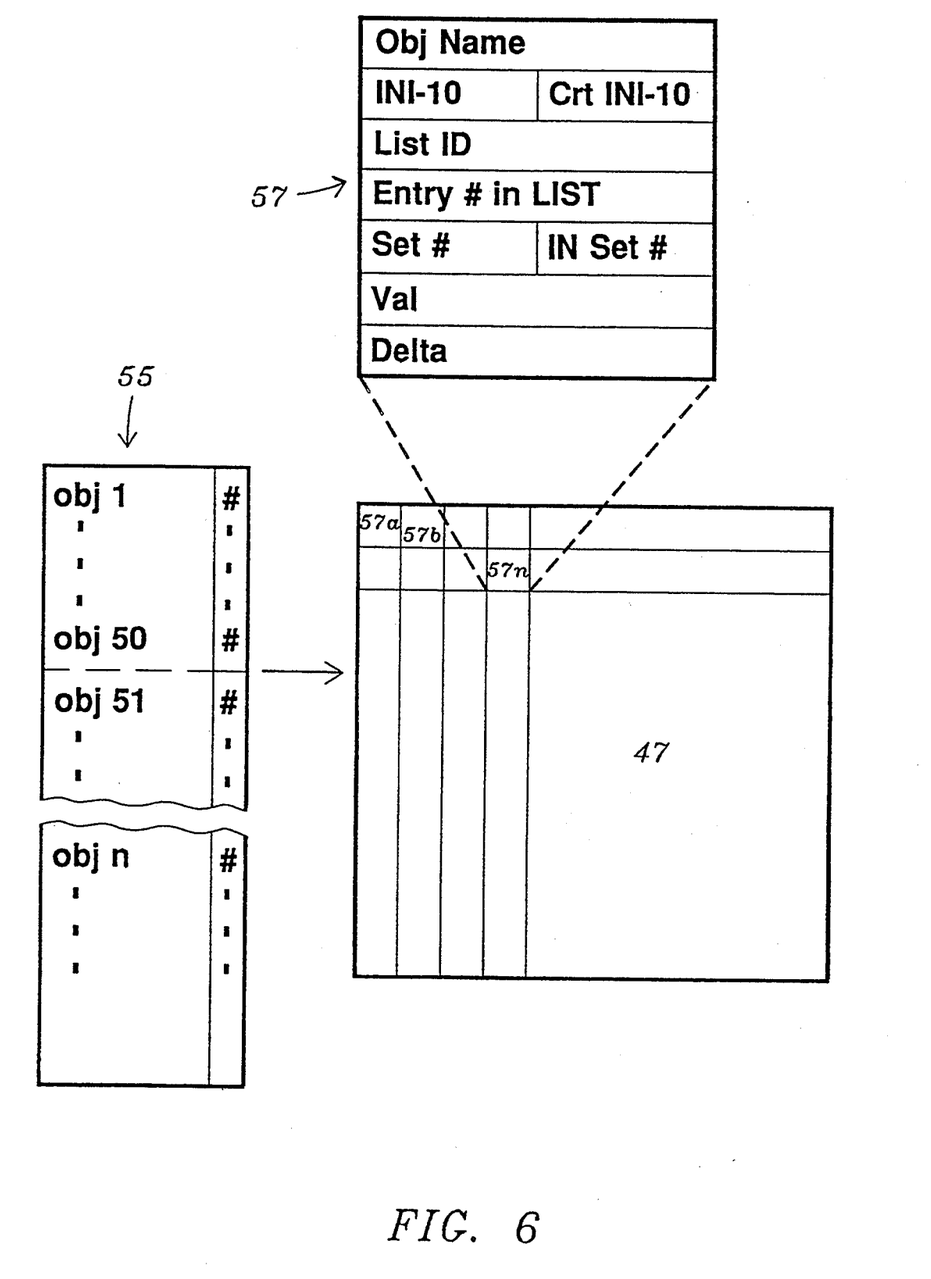
FIG. 6 is a partially exploded block diagram of the data structures supporting the software routines of the embodiment of FIG. 2.

FIG. 6 provides a block diagram, partially exploded, of the data structures which support the preferred implementation of the present invention. Included are a database 47 and an index table 55. Database 47 holds a multiplicity of data entries or data points 57 at respective positions in the database. Each position and hence each data point is referenced by an index number which, in the preferred embodiment, is a typical coordinate number of the database 47. Each data entry 57 in the database 47 contains information of a respective object. In particular, the contained information includes object name, identification number of the initial INI-10 supporting access of the object, identification number of the current INI-10 supporting access of the object, identification of the INI-10 list in which the object data is stored, entry number within the list (e.g., 0–49), set number, entry number within the set, latest object value and delta value (described later) as shown in FIG. 6.

Index table 55 is a listing of each object made accessible by each INI-10. Table 55 is organized such that the first 50 objects listed in the table correspond to the objects of the first list of a first INI-10. The second 50 objects listed in the table correspond to the objects of the second list of the first INI-10, and so on for each list of the first INI-10 and on to each list of the other INI-10's. Thus, index table 55 mimics the data from the series of INI-10's (gateways 39) corresponding to a computer node 33, 35. Of particular interest, for each object in table 55, a database index number is provided. To that end, the table 55 provides cross referencing from an object to the corresponding data point 57 in the database 47.

Figure 2:
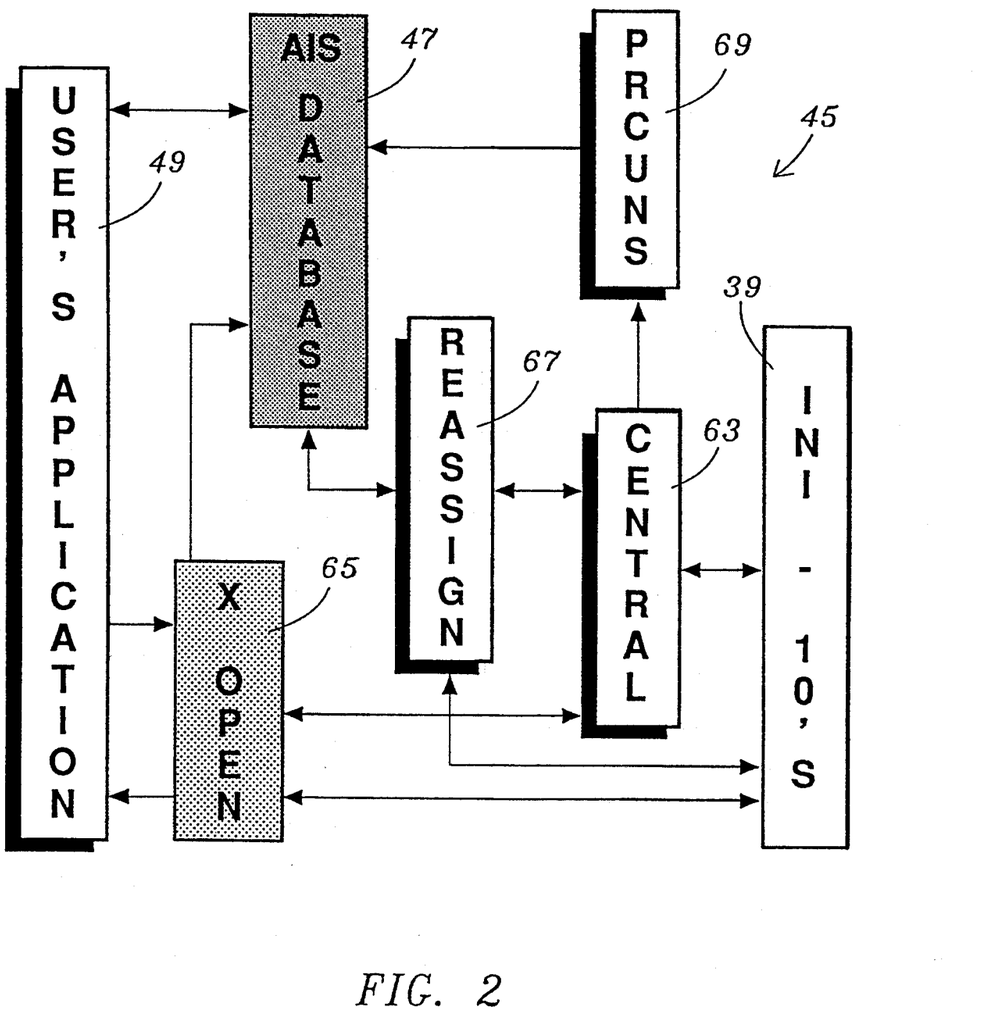
FIG. 2 is a block diagram of one embodiment of the present invention.

Referring to FIG. 2, the AIS 45 employs various working blocks 63, 65, 67, 69 to implement the redundancy of the present invention. There are five states of operation of the AIS 45:

AIS 45 initialization;
opening of a set;
normal running of AIS 45;
INI-10 (gateway 39) failure; and
INI-10 (gateway 39) recovery.

Each of these states is described next in terms of the working blocks more accurately called tasks and subroutines 63, 65, 67, 69 of FIG. 2.

1. AIS Initialization

AIS 45 initialization takes place between the CENTRAL task 63 and the INI-10's (gateway 39). The CENTRAL task 63 establishes switched virtual circuits to the INI-10's (gateways 39) from AIS 45. These circuits provide the communication links and data transfer line between the working blocks of AIS 45 and the INI-10's (gateways 39). Circuit elements and circuit establishment methods common in the art are used.

2. Opening of a Set

Opening of a set takes place between the user application 49, the AIS open subroutine 65, the CENTRAL task 63, and the INI-10's (gateways 39). The user application 49 passes to subroutine open 65 a set of desired object names, together with identification numbers of the preferred INI-10 per object and a delta number for each object. The delta number indicates the change in the value of an object. The open subroutine 65 sorts the set according to INI-10 number and forms a new list for an INI-10 for every 50 objects corresponding to the INI-10. Next, subroutine open 65 passes requests to the CENTRAL task 63 to open each formed list on the corresponding INI-10's. The CENTRAL task 63 opens the lists of the INI-10's and updates index table 55 and corresponding database 47 entries with list identification numbers that the INI-10 returns to CENTRAL task 63. After all lists are open, the open subroutine 65 reads through respective INI-10's the initial values of the objects in the set and updates the database 47 to reflect these values at corresponding data points 57. The open subroutine 65 also updates the database 47 with the delta numbers for each object. Further, open subroutine 65 provides calling user application 49 the set numbers and indexes of the requested objects. Thereafter, user application 49 uses the set numbers and/or indexes for direct access of corresponding data points 57 in database 47.

3. Normal Running of AIS 45

During the normal running of AIS 45, the INI-10's (gateways 39) send change driven messages to the CENTRAL task 63 over the established switched virtual circuits. That is, after opening lists on INI-10's, the INI-10's detect changes in operating environment. Upon detecting a change, an INI-10 transmits a pertinent message over the switched virtual circuit to CENTRAL task 63. The CENTRAL task 63 sends the message to the process unsolicited messages task (PRCUNS) 69. The PRCUNS task 69 processes the message and updates the changed values in the database entries 57. To access the proper data points 57 in database 47, PRCUNS 69 refers to table 55 using the INI-10 identification number, list identification number, and entry number within the list (e.g., 0–49) of the gateway 39 which generated the unsolicited message.

PRCUNS 69 is employed to provide a queueing and processing task for unsolicited messages such that CENTRAL task 63 is freed of such processing. It is understood that processing of unsolicited messages could be accomplished by CENTRAL task 63 or another task if no PRCUNS 69 were used and steps were taken to prevent overloading of CENTRAL task 63.

4. INI-10 (Gateway 39) Failure

If an INI-10 fails, the CENTRAL task 63 receives from the failed INI-10 a message that the switched virtual circuit therebetween has been disconnected. In response, CENTRAL task 63 sends a pertinent indication to the REASSIGN task 67. The REASSIGN task 67 checks index table 55 and/or the database 47 to determine which INI-10s are available and how many lists are open on each INI-10. The REASSIGN task 67 transmits requests to CENTRAL task 63 to open lists on determined INI-10s for the lists on the failed INI-10. CENTRAL task 63 opens the requested lists which effectively switches lists of the failed INI-10 to the determined INI-10s. CENTRAL task 63 then returns to REASSIGN task 67 the list identification numbers of the INI-10s where CENTRAL task 63 stored the lists of the failed INI-10.

REASSIGN task 67 updates corresponding database entries 57 with the new list identification numbers and identification numbers of the determined (backup) INI-10s. REASSIGN task 67 also updates the object values held in the corresponding database entries 57.

If a determined INI-10 becomes full (has all the open lists it can possibly accommodate) with only some of the lists from the failed INI-10 and further lists from the failed INI-10 remain on the failed INI-10, REASSIGN task 67 performs one of two allowable steps. In step 1, REASSIGN task 67 leaves the remaining lists on the failed INI-10 and assigns pseudo-list identification numbers therefore. REASSIGN task 67 also indicates in the database 47 that object values for the lists with pseudo-identification numbers are not valid. This is accomplished by the setting or insertion of flags, symbols or the like in the value or other pertinent fields of the data entries 57 corresponding to the objects of the lists. In an alternative step, REASSIGN task 67 opens lists on a second determined available INI-10 in a manner similar to opening the lists on a first determined INI-10. In either case, REASSIGN task 67 updates the database 47 accordingly.

5. INI-10 (Gateway 39) Recovery

The REASSIGN task 63 monitors (checks) the INI-10's every thirty seconds. If an INI-10 changes state from FAILED to FUNCTIONAL, then REASSIGN task 67 sends a request to the CENTRAL task 63 to reestablish connections with the INI-10. Subsequent to the reestablishment of a switched virtual circuit between CENTRAL task 63 and the subject INI-10, the REASSIGN task 67 requests CENTRAL task 63 to open lists on the subject INI-10 for the lists on a corresponding backup INI-10 as indicated in the database 47. Along with the request to open lists, REASSIGN task 67 requests CENTRAL task 63 to close the lists on the backup INI-10. Thereafter REASSIGN task 67 updates the database 47 with current INI-10 identification number, list identification numbers and latest object values read through the newly opened INI-10.

During all the above states, the user application 49 may access the values of the objects in the database 47. In other words, user access into the database 47 is independent of the state of the INI-10's (gateways 39).

Figure 7A:
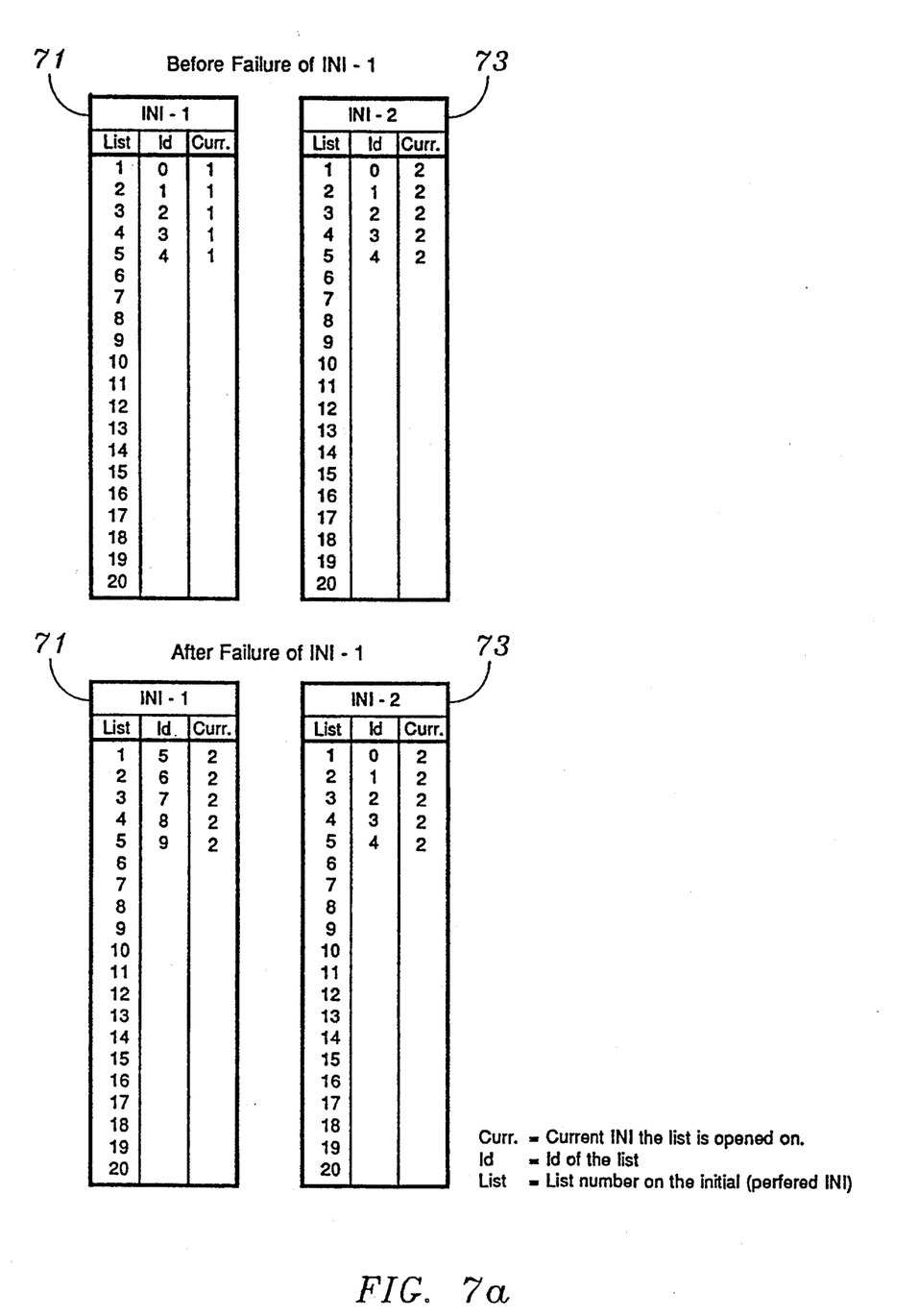
FIGS. 7a–7c are illustrations of operation of the present invention to provide redundancy in gateways of the process plant of FIG. 1.
Figure 7B:
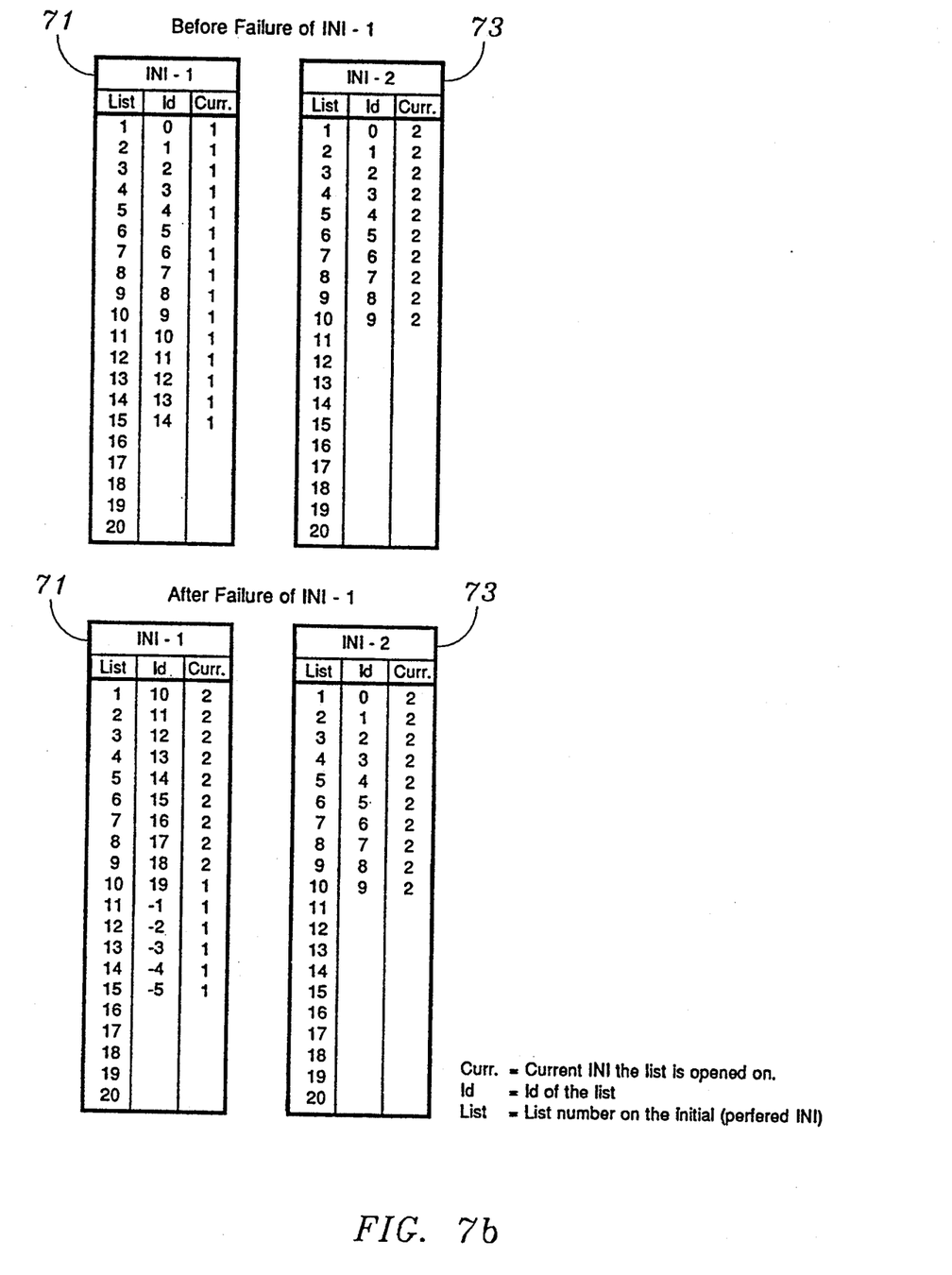
Figure 7C:
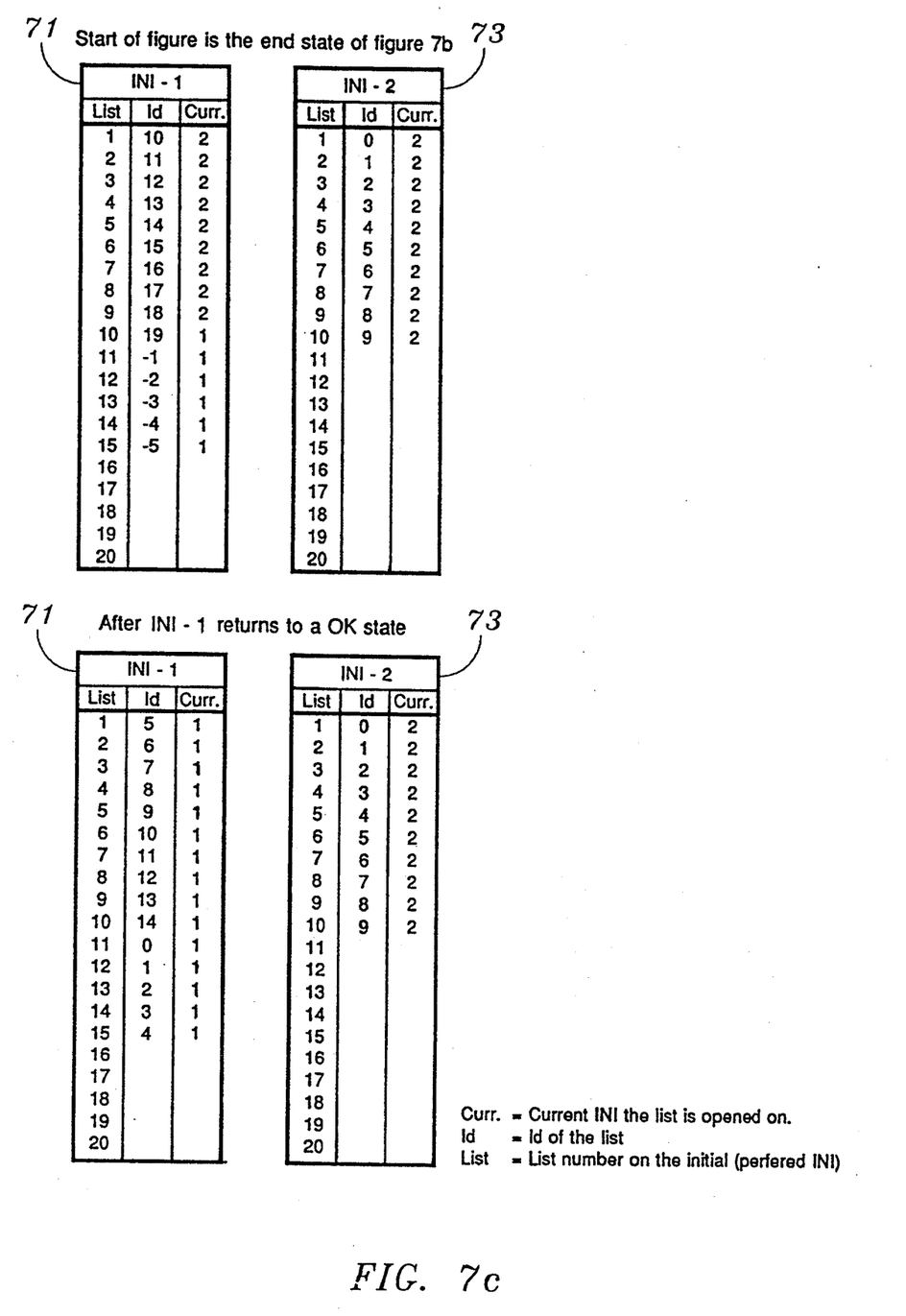

FIGS. 7a-7c illustrate the above described handling of the lists between an initial INI-10 and a backup INI-10.

In a first example illustrated in FIG. 7a, five lists are initially open on gateway 71 (INI-10 identification number 1), and another five lists are initially open on gateway 73 (INI-10 identification number 2). Gateway 71 changes states from FUNCTIONAL to FAILED. The REASSIGN task 67 moves the lists opened on gateway 71 to gateway 73. REASSIGN task 67 updates database 47 by changing the current INI-10 number from 1 to 2 and by changing the list identification numbers from 0, 1, 2, 3, 4 to 5, 6, 7, 8, 9 which were the next available list identification numbers on backup gateway 73.

The second example shown in FIG. 7b has fifteen lists open on gateway 71 as their initial INI-10 and ten lists open on gateway 73 as their initial INI-10. Gateway 71 changes states from FUNCTIONAL to FAILED. The REASSIGN task 67 moves the lists open on gateway 71 to gateway 73 and updates the database 47 to reflect this by changing the current INI-10 number from 1 to 2 and by updating the list identification numbers from 0, 1, 2, 3, 4, 5, 6, 7, 8, 9, 10, 11, 12, 13, 14 to 10, 11, 12, 13, 14, 15, 16, 17, 18, 19, −1, −2, −3, −4, −5 respectively. The list identification numbers 10 through 19 were the next available list identification numbers on gateway 73. At that point, gateway 73 is completely filled with lists and no more lists are able to be accommodated. Hence, the remaining lists were given pseudo identification numbers −1 through −5. The pseudo list ids are still contributed to their initial gateway 71.

The third example shown in FIG. 7c begins with the end state of example 2 of FIG. 7b. Gateway 71 returns to a FUNCTIONAL state. The REASSIGN task 67 responds by first moving the pseudo lists back to initial gateway 71 and then moves the back-up lists opened on gateway 73 back to initial gateway 71. The fact that the lists are assigned different identification numbers than in the initial opening of gateway 71 is not of importance to the working of the AIS 45, because applications 49 are able to access object values in the database 47 independent of list number, gateway number, and list identification number.

Flow diagrams of the above functioning of subroutine open 65, CENTRAL task 63 and REASSIGN task 67 are provided in FIGS. 3-5 and discussed next.

Figure 3:
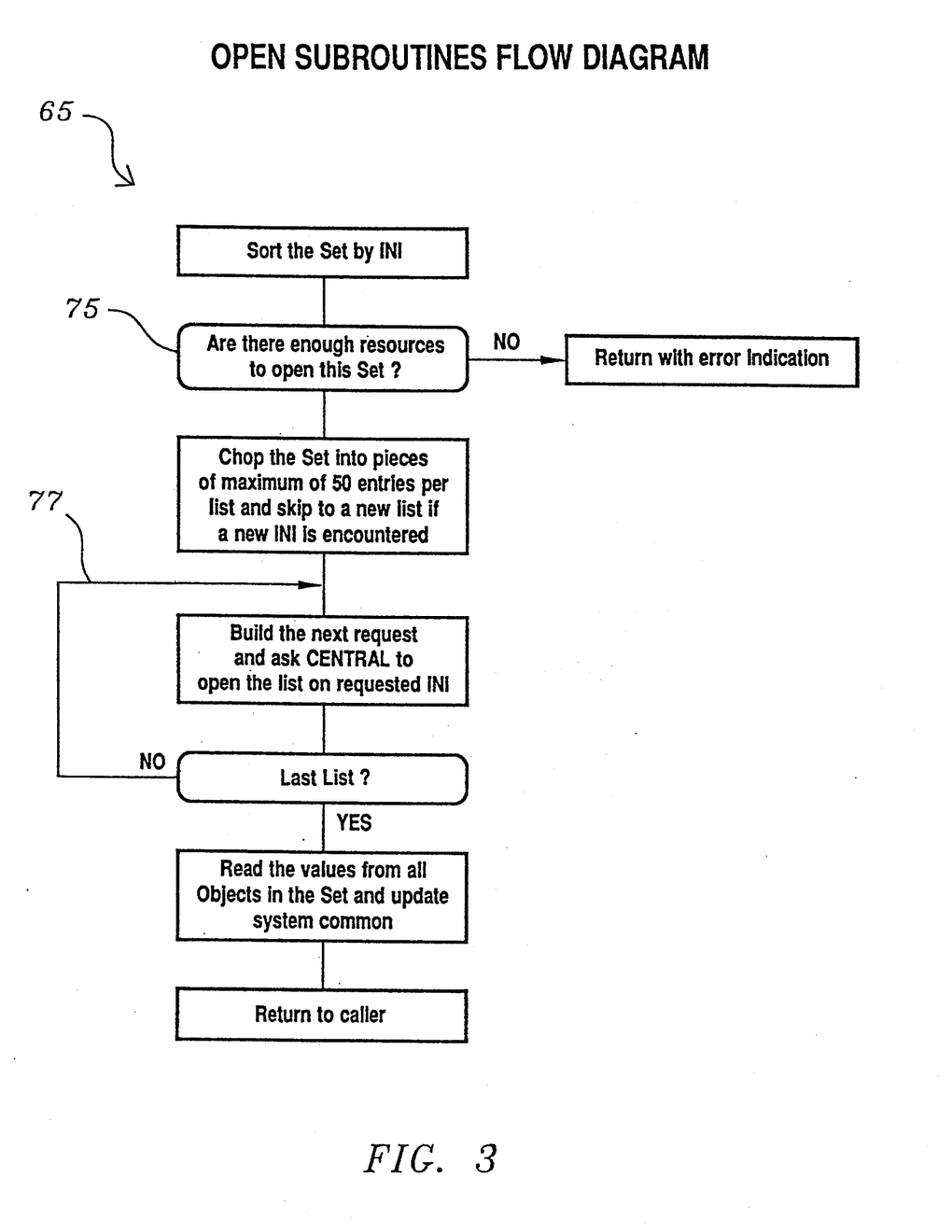
FIG. 3 is a flow diagram of a subroutine for opening access to sets of data objects in the embodiment of FIG. 2.

FIG. 3 provides a flow chart of open subroutine 65. Upon being called by user application 49, open subroutine 65 sorts the set provided by the application 49. Open subroutine 65 sorts according to gateway 39 identification number. Next at 75, open subroutine 65 determines whether there are enough gateways 39 and lists thereon to open the subject set. If there are not enough gateways 39, then open subroutine 65 returns to user application 49 with an error. If there are enough gateways 39, open subroutine 65 segments the sorted set into pieces or lists of a maximum of 50 objects. Open subroutine 65 provides objects corresponding to one preferred gateway in a different segment than objects corresponding to another gateway.

For each requested gateway, open subroutine 65 passes a series of requests to CENTRAL task 63 to open the lists on the requested gateway. This is illustrated at loop 77 of FIG. 3. Each request in the series of requests opens a different list on the requested gateway. After completing the list opening loop 77, open subroutine 65 reads object values through the open gateway lists and in turn updates database 47. Open subroutine 65 then returns to the calling user application 49 indicating set number and database indexes of the objects currently opened on the requested gateways.

Figure 4A:
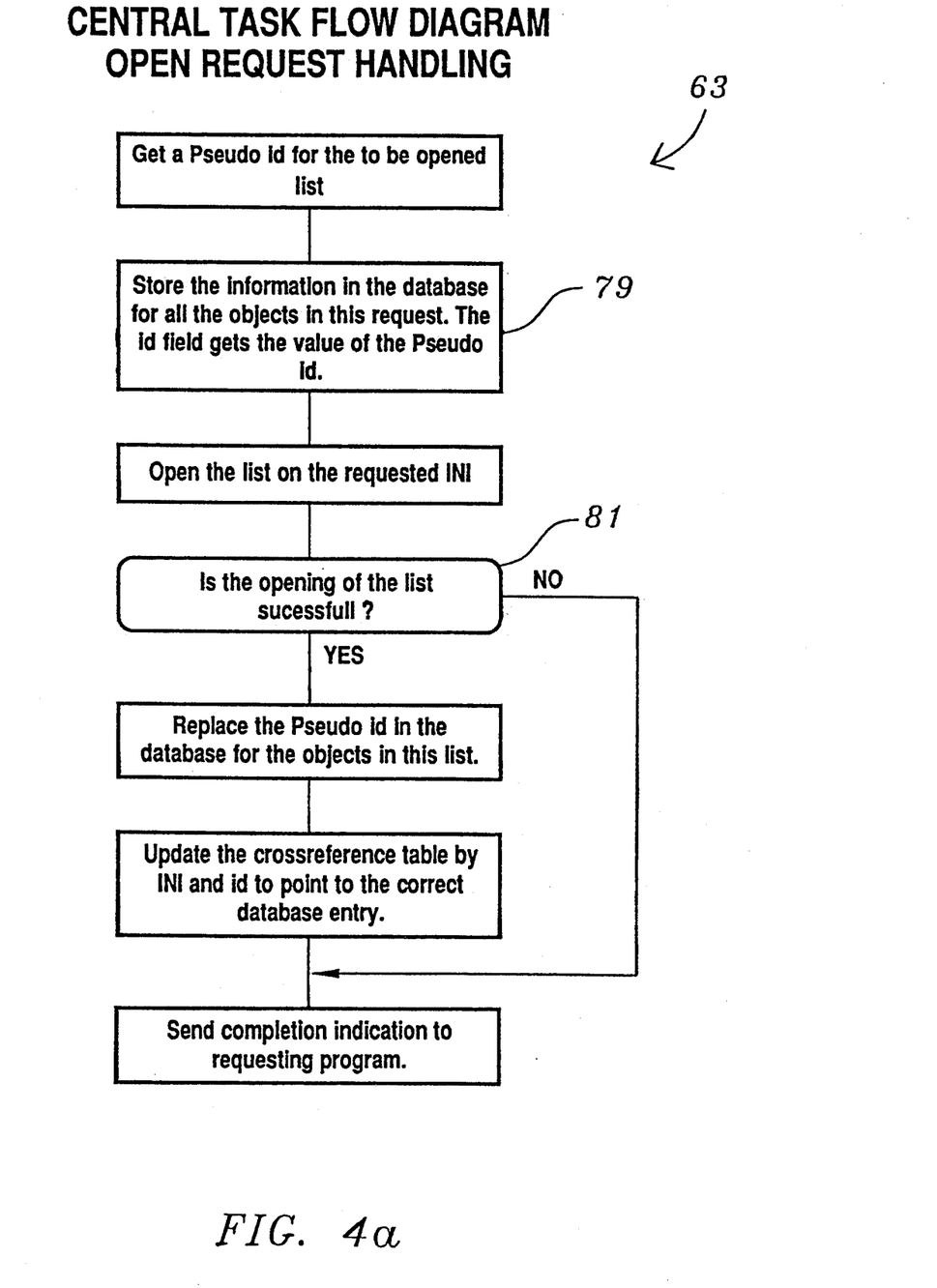
FIGS. 4a and 4b are flow diagrams of a central task routine in the embodiment of FIG. 2.
Figure 4B:
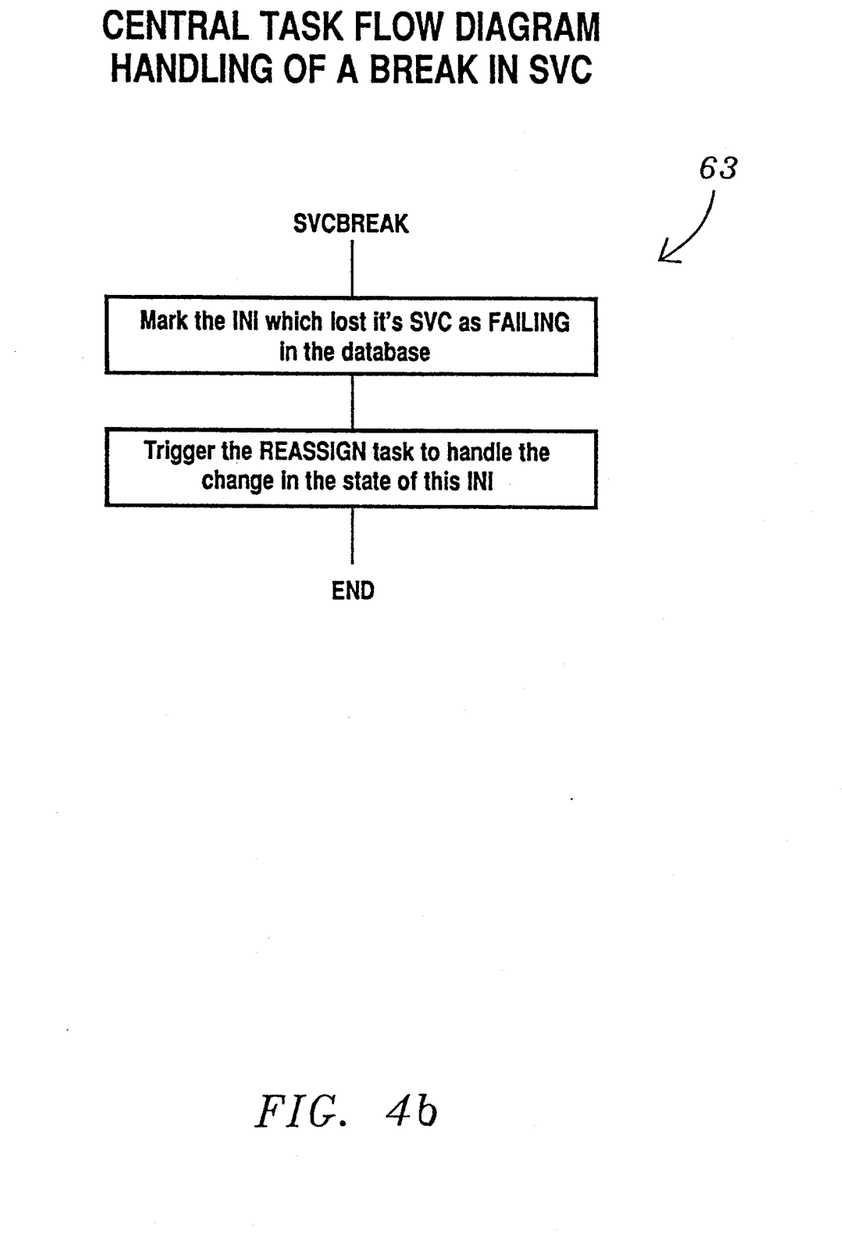

FIGS. 4a and 4b provide flow charts of the functioning of the CENTRAL task 63. Illustrated in FIG. 4a are the steps performed by the CENTRAL task 63 in response to a request to open a list on a gateway 39. Upon such a request, CENTRAL task 63 begins by establishing a pseudo-list identification number for the list to be opened. Next at 79, CENTRAL task 63 stores in database 47 the information of the objects involved in the current request. The list identification field of the data entry 57 is assigned the value of the pseudo-list identification number. CENTRAL task 63 then opens the lists on the requested gateway 39.

If the opening of the list is not successful 81, then CENTRAL task 63 returns to the requesting program with an indication that the CENTRAL task 63 has completed the request as best possible. If the opening of the list is successful, CENTRAL task 63 replaces the pseudo-list identification number in the database entries 57 with the respective open list identification number for the objects in the subject list. CENTRAL task 63 then updates the index table 55 according to involved gateway 39 and list identification number such that the corresponding entries in table 55 provide the correct respective indexes into database 47. CENTRAL task 63 then sends a completion indication to the requesting program and returns control to the program.

FIG. 4b provides a flow chart of the CENTRAL task 63 responding to a break in a switched virtual circuit between a gateway 39 and the AIS 45. Such an event may be received and handled by CENTRAL task 63 in parallel with all other activities of CENTRAL task 63. After receipt, CENTRAL task 63 marks pertinent database entries with an indication that the corresponding INI-10 has lost its switched virtual circuit and is thus failing. Next, CENTRAL task 63 triggers the REASSIGN task 67 to handle the change in state of the gateway 39.

Figure 5:
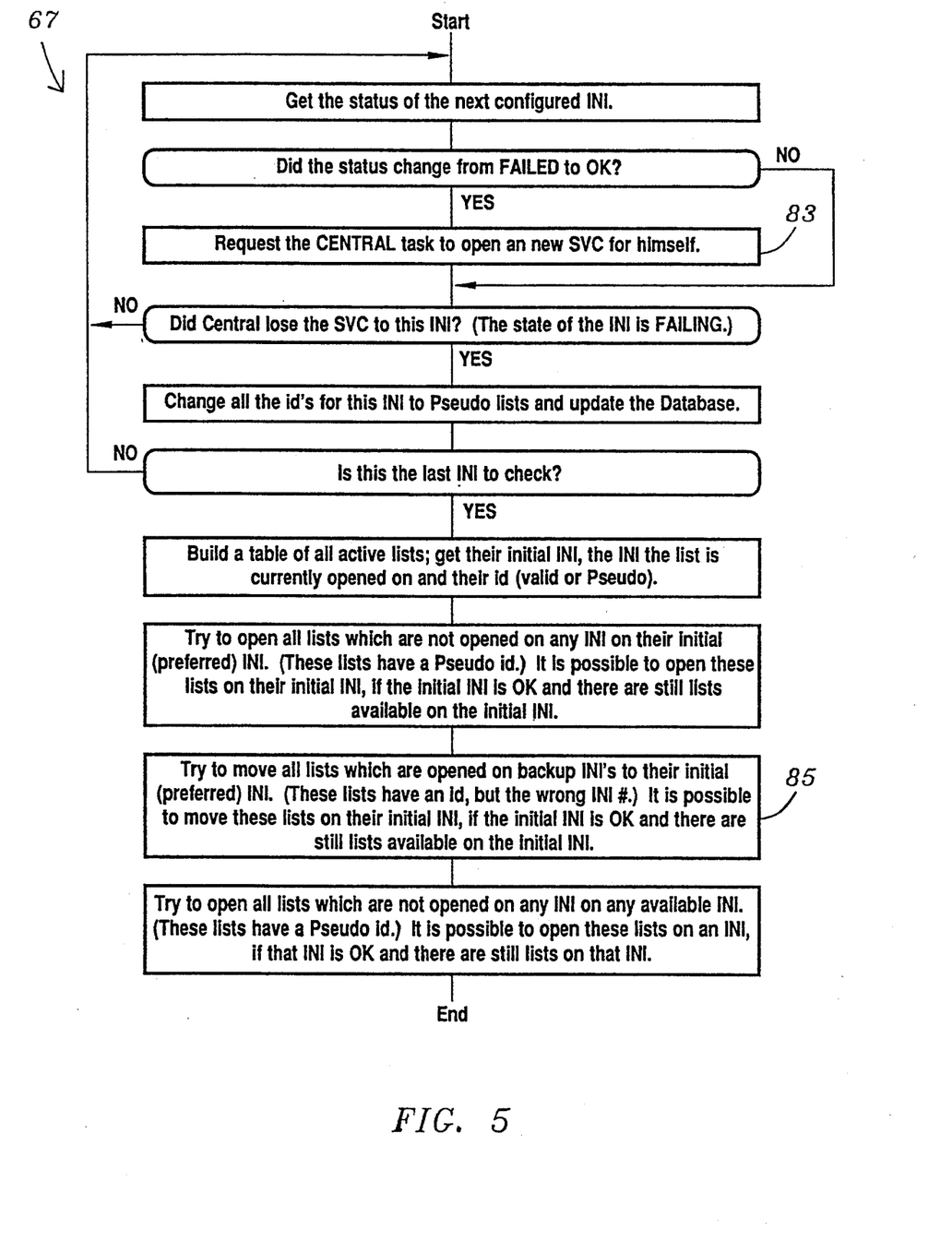
FIG. 5 is a flow diagram of a software routine providing redundancy in the embodiment of FIG. 2.

FIG. 5 provides a flow chart of the functioning of REASSIGN task 67. The REASSIGN task 67 is reactivated every 30 seconds or so and, in addition, is reactivated by CENTRAL task 63 if a switched virtual circuit is lost between a gateway 39 and AIS 45. The REASSIGN task 67 begins by checking the status of a gateway 39. This is a different gateway for each activation of the REASSIGN task 67, and preferably the gateways 39 are monitored in a predefined order. REASSIGN task 67 determines whether the subject gateway 39 has changed from a failed status to a functional status. If the gateway 39 has changed status from failed to functional, then at 83 REASSIGN task 67 requests CENTRAL task 63 to open a switched virtual circuit for the subject gateway 39. If the REASSIGN task 67 determines that no such change in status has occurred in the subject gateway 39, then step 83 is omitted.

In any case, REASSIGN task 67 continues by determining whether or not the subject gateway 39 is currently failing, i.e., CENTRAL task 67 has recently lost the switched virtual circuit to the subject gateway 39. In the event that the subject gateway 39 is not in a state of failing, the REASSIGN task 67 ends and begins anew upon timed activation or activation by CENTRAL task 63.

In the event that the subject gateway 39 is in a state of failing, REASSIGN task 67 changes all of the list identification numbers for the gateway 39 to pseudo-list numbers and updates the database 47 accordingly.

REASSIGN task 67 then determines whether the subject gateway 39 is the last gateway to process. If not, then REASSIGN task 67 begins anew with the determination of status of the next gateway 39.

If the gateway 39 is the last gateway for the REASSIGN 67 to process, then the task 67 builds a table of all the active lists. Included in the table are the initial gateway numbers, the number of the gateway on which the list is currently opened and the list identification numbers (valid or pseudo). After building the table, REASSIGN task 67 attempts to open on respective preferred (initial) gateways 39 all lists which are not opened on any gateway. It is these lists which have a pseudo-list identification number. It is possible to open these lists on their initial gateway 39 if the initial gateway is functional and there are still lists available on the gateway. In the next step 85, REASSIGN task 67 tries to move all lists which are open on backup gateways 39 to their initial (preferred) gateways. These lists have a list identification number, but a mismatched gateway number. It is possible to move these lists onto their initial gateway if the initial gateway is functional and there are still lists available on the gateway.

In a last step, REASSIGN task 67 attempts to open on any available gateway 39 all lists which are not on any gateway at this point. These lists have pseudo-list identification numbers. It is possible to open these lists on a gateway 39 if that gateway is functional and there are still lists available on the gateway.

While the invention has been particularly shown and described with reference to a preferred embodiment thereof, it will be understood by those skilled in the art that various changes in form and detail may be made therein without departing from the spirit and scope of the invention as defined by the appended claims.

What is claimed is:

1. In a data processing system having a host processor and a network of working computer nodes linked to the host processor over the network for communication therebetween according to a predefined host processor protocol, each one of said working computer nodes having respective computer node data, interface apparatus comprising:

a plurality of gateways coupled between the host processor and the working computer nodes, each gateway coupled to a respective multiplicity of working computer nodes, said gateways serving as interpreters between respective working computer nodes and programs executed on the host processor and each gateway having a data list indicating names of items of computer node data at the respective working computer nodes which items are accessible by the host processor via the gateway which has the data list, such that programs executed on the host processor use the host processor protocol to request computer node data by item name and the gateways support access to the computer node data according to item name; and data handling means coupled to the gateways to interface the programs executed on the host processor with the gateways, the data handling means storing a relationship between each computer node data item and a gateway which has a data list which includes the computer node data item name, the data handling means receiving a request for a computer node data item by item name from a program executed on the host processor and identifying a gateway which has a data list indicating the item name received;

wherein, during times of one gateway disfunctioning, the data handling means copies a data list from the one disfunctioning gateway to a second functioning gateway and modifies the stored relationship between the computer node data items and the gateways such that the second gateway supports access to the computer node data items whose names are indicated in the copied data list instead of the one gateway, said copying of the data list from the one gateway to the second gateway enabling programs executed on the host processor to continue requesting computer node data by item name and in a manner that is free of change in host processor protocol.

2. Apparatus as claimed in claim 1 wherein:
the computer node data is object oriented data; and
for each gateway, the gateway data list includes a plurality of lists of data objects.

3. Apparatus as claimed in claim 1 wherein the data handling means further copies the data list back to the one gateway from the second gateway upon the one gateway returning to normal functioning.

4. Apparatus as claimed in claim 1 further comprising a database coupled to the network of working computer nodes for storing computer node data of each of the working computer nodes, the data handling means maintaining the database for host processor access.

5. In a data processing system having a host processor and a network of working computer nodes linked to the host processor over the network for communication therebetween according to a predefined host processor protocol, each one of said working computer nodes having respective computer node data and the network of working computer nodes including object oriented data handling, a method of interfacing between the host processor and the network of working computer nodes, comprising the steps of:

providing a plurality of gateways, each having a data list indicating names of items of computer node data;

coupling each gateway between the host processor and a respective multiplicity of working computer nodes such that said gateways serve as interpreters between respective working computer nodes and programs executed on the host processor by each gateway having a data list indicating names of items of computer node data at the respective working computer nodes which items are accessible by the host processor via the gateway which has the data list, such that programs executed on the host processor use the host processor protocol to request computer node data by item name and the gateways support access to the computer node data according to item name;

storing in a data handling means a relationship between each computer node data item and a gateway which has a data list which includes the computer node data item name such that requests for computer node data by item name are identified with gateways which support the requests;

executing a program on the host processor;

with said data handling means, receiving from the host processor a request for a computer node data item by data item name;

referencing by said data handling means the stored relationship between data items and gateways to identify the gateway which supports access to the requested computer node data item;

accessing the requested computer node data item with support from the identified gateway; and changing location of a data list by copying the data list from one gateway to a second functioning gateway during times of the one gateway disfunctioning and modifying the stored relationship between the computer node data items and the gateways, such that the second gateway supports access to the computer node data items whose names are indicated in the copied data list instead of the one gateway, said copying of the data list from the one gateway to the second gateway enabling programs executed on the host processor to continue requesting computer node data by item name and in a manner that is free of change in host processor protocol.

6. A method as claimed in claim 5 wherein the step of changing location of the data list by copying the data list is performed by an application interface routine executed by the host processor.

7. A method as claimed in claim 5 further comprising the step of copying the data list back to the one gateway from the second gateway, such that the one gateway resumes supporting access to the computer node data.

8. A method as claimed in claim 5 further comprising the step of storing computer node data in a database for access by the host processor, said step of storing including maintaining the database.

9. A method as claimed in claim 8 wherein the steps of changing location of the data list by copying the data list and storing computer node data in the database is performed by an application interface coupled to the host processor.

* * * * *